A. J. BERGEN.
Cartridge.

No. 62,466.  
Patented Feb. 26, 1867.

Witnesses:  
Geo. D. Waister  
Chas. H. Smith

A. J. Bergen

UNITED STATES PATENT OFFICE.

ALEXANDER J. BERGEN, OF BROOKLYN, NEW YORK.

IMPROVEMENT IN METALLIC CARTRIDGES.

Specification forming part of Letters Patent No. 62,466, dated February 26, 1867.

*To all whom it may concern:*

Be it known that I, ALEXANDER J. BERGEN, of Brooklyn, in the county of Kings and State of New York, have invented, made, and applied to use, a certain new and useful Improvement in Cartridges; and I do hereby declare the following to be a full, clear, and exact description of the said invention, reference being had to the annexed drawing, making part of this specification, wherein—

Figure 3:
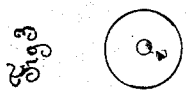
Figure 2:
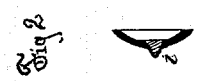
Figure 1:
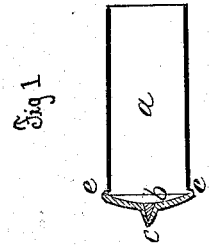

Figure 1 is a section of said cartridge. Fig. 2 is a section, and Fig. 3 a plan of the base detached.

Similar marks of reference denote the same parts.

Cartridges with dome-shaped bases have heretofore been made with nipples in their central portion at the rear, as seen in Letters Patent granted January 5, 1864, No. 41,184.

The nature of my said invention consists in a sheet-metal cartridge-case, formed with a dome-shaped rear end, a central teat for the fulminate, and a flange surrounding the rear end of the cartridge, by means of which it may be pulled out of the rear end of the barrel; and I combine with a cartridge-case, made as aforesaid, a disk containing a nipple for fulminating material, so that the metallic cartridge-case may be used several times, so as to avoid carrying such a large amount of fixed ammunition.

In the drawing, $a$ is the cylindrical part of the case; $b$, the dome-shaped rear end of the cartridge, of more or less convexity. $c$ is the teat containing the fulminate, and projecting from the center of the rear end of the cartridge. $e$ is the flange around the rear end or base of the cartridge, by means of which the same may be withdrawn from the breech of the gun, for which object any desired mechanism may be employed.

After a cartridge has been used the teat $c$ may be filed or cut off and the cartridge-case made use of several times by introducing the flanged teat $i$, (seen in Figs. 2 and 3,) previous to charging the case with powder and ball or shot. The teat projects, and is to be fired as usual, and by my mode of construction the necessity of carrying a quantity of fixed ammunition is avoided, as the flanged teats $i$ are the only things that have to be renewed.

The flange around the sheet-metal cartridge-case enables me to pull the same out of the gun, this being the only office of the said flange, as it does not contain any fulminate. The base, being convex or dome-shaped, prevents the metal being strained in the manufacture of the case as much as it would be if the teat were longer and the base flat, and the convexity of the base allows for a recoil-shield being made in the fire-arm that will properly support the cartridge-case, and also allow the hammer to act on the side of a short nipple.

What I claim, and desire to secure by Letters Patent, is—

1. The cartridge-case $a$, formed of sheet metal, with a dome-shaped end, $b$, and a central teat, $c$, for the fulminate, in combination with the flange $e$, surrounding the case, as and for the purposes set forth.

2. The movable flanged teat $i$, in combination with the said flanged dome-shaped sheet-metal cartridge-case, as and for the purposes set forth.

Dated October 11, 1866.

A. J. BERGEN.

Witnesses:
CHAS. H. SMITH,
GEO. D. WALKER.